INVENTORS
HENRY P. KIRCHNER
RALPH E. WALKER

BY Wenderoth, Lind & Ponack

ATTORNEYS

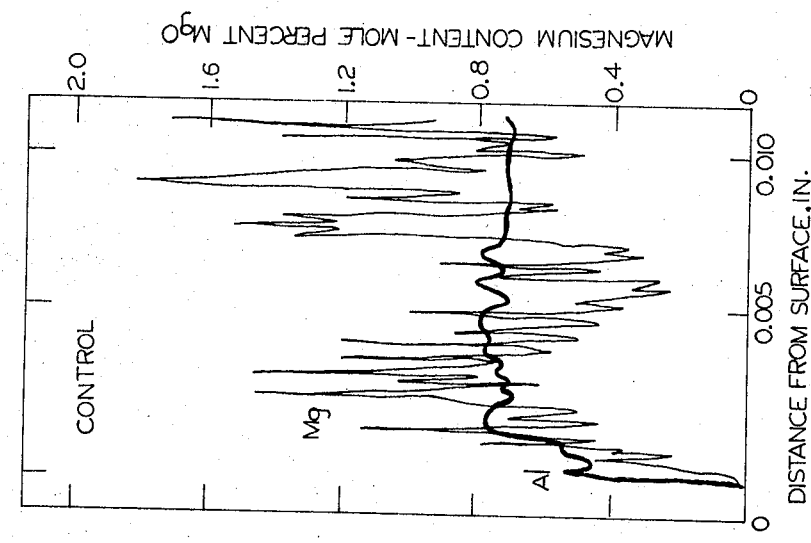
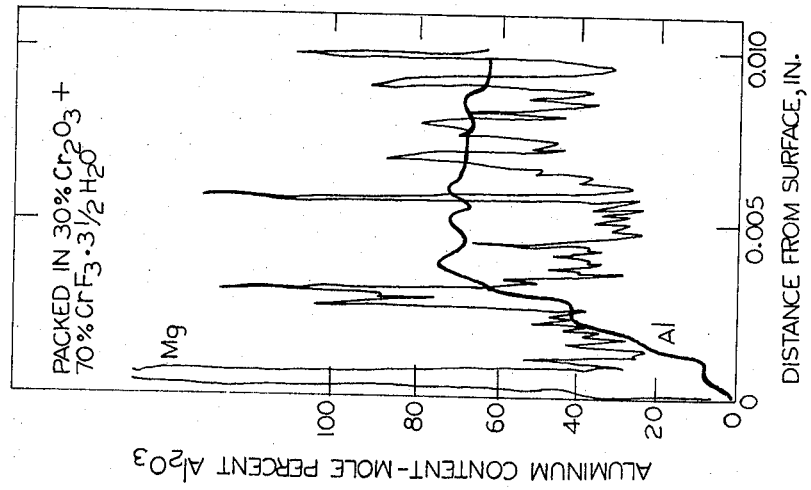

Sept. 11, 1973    H. P. KIRCHNER ET AL    3,758,328
METHOD OF STRENGTHENING ALUMINA AND SPINEL BODIES
Filed Aug. 25, 1970    4 Sheets-Sheet 4

FRENCHTOWN ALUMINA, 1650°C ONE HOUR PACKED IN 50% $Cr_2O_3$ + 50% $CrF_3 \cdot 3\tfrac{1}{2}H_2O$ FRENCHTOWN 94% ALUMINA, 1650°C ONE HOUR PACKED IN 80% $Cr_2O_3$ + 20% $CaF_2$ FRENCHTOWN 94% ALUMINA, 1650°C ONE HOUR PACKED IN $Cr_2O_3$

INVENTORS
HENRY P. KIRCHNER
RALPH E. WALKER

BY *Wenderoth, Lind & Ponack*
ATTORNEYS

United States Patent Office 3,758,328
Patented Sept. 11, 1973

3,758,328
METHOD OF STRENGTHENING ALUMINA AND SPINEL BODIES
Henry P. Kirchner, State College, and Ralph E. Walker, Julian, Pa., assignor to Henry P. Kirchner, State College, Pa.
Continuation-in-part of abandoned application Ser. No. 669,859, Sept. 22, 1967. This application Aug. 25, 1970, Ser. No. 66,785
Int. Cl. C23c 17/00
U.S. Cl. 117—107.2 P                  11 Claims

ABSTRACT OF THE DISCLOSURE

A method of strengthening alumina and spinel bodies by forming at an elevated temperature on at least one surface of the body a coating of a low expansion material. The method comprises the steps of packing the ceramic body in a mixture of $Cr_2O_3$ and $CrF_3$, $CrCl_3$, $AlF_3$, $CaF_2$ or $NH_4F$. The thus packed ceramic body is then refired.

---

This application is a continuation-in-part of application Ser. No. 669,859, filed Sept. 22, 1967, now abandoned.

The present invention relates to a method of physically strengthening polycrystalline ceramic bodies, specifically bodies of alumina and bodies of spinel, and to the alumina and spinel bodies strengthened by this method.

By the term "spinel" is meant the specific magnesium aluminum oxide material found in nature or the artificial material similar in composition and structure, but without most of the impurities.

Alumina bodies and spinel bodies are finding more and more uses in present day technology, such as in radomes, windows for passing radiant energy in electronic tubes, and in structures used in aerospace technology. In addition, these ceramic materials have found considerable use in refractory technology.

A greater drawback in the successful use of such materials has been their relatively fragile nature, both with respect to ordinary physical stresses and strains as well as so-called thermal shock. While these materials can withstand compressive stresses quite well, they are quite poor in their ability to withstand tensile stresses and bending stresses. This quite naturally limits their use in such structures as radomes and the like. This inability to withstand tensile stresses well also bears on their inability to withstand thermal shock. They withstand so-called temperature up shock, i.e. the stresses developed within the material when it is being heated up, quite well, since the material tends to expand during the heating, thus becoming subjected to compressive stresses within the confines of the outside surfaces of the body. However, such materials do not withstand so-called temperature down shock, i.e. the stresses developed within the material when it is cooled. This is because when the contraction due to the cooling takes place, tensile stresses occur within the surface layers, and these tensile stresses are not well withstood by the material. As a result, flaws develop within the surface layer of the material which can in turn lead to catastrophic failure of the entire body of the material.

It is an object of the present invention to provide a method of treating alumina bodies and spinel bodies so as to improve their bending strength, thermal shock resistance properties, and hardness.

It is a further object of the invention to provide treated bodies of alumina and a spinel which have improved bending strength, thermal shock resistance and hardness characteristics.

It has been found that if there is formed at an elevated temperature on at least one surface of an alumina body or a spinel body a coating of a low expansion material, which in a preferred embodiment is a solid solution of a plurality of ceramic materials having a coefficient of expansion which is less than that of the ceramic of the body, when the body is cooled, there is produced on the surface layer thereof a layer which is under compression. Preferably the coating is formed in a way such that an additive material which mixes with the material of the body to form the compressive coating and the material of the body itself are present in proportions which vary from a high proportion of additive material to a low proportion of the additive material the deeper into the body the additive material penetrates. This results in a stress gradient in the finished material with the greatest compression of the coating being at the surface thereof, and the compressive stresses decreasing in the direction of the center of the body.

More particularly, this method comprises forming at an elevated temperature on at least one surface of an aluminum oxide body or a spinel body, a coating of a low expansion material which in a preferred embodiment, is a solid solution of metal oxide ceramic materials, one of which is a metal oxide of the body, and which solid solution has a lower coefficient of expansion than the coefficient of expansion of the body.

One particular method of forming the low expansion material coating has been to pack the body, which may or may not have been pretreated by fluorinating it, in chromium oxide, and refiring the thus packed body to form a solid solution of chromium oxide and aluminum oxide. While these methods have been found to increase the bending strength and thermal shock resistance characteristics of alumina and spinel, we have now unexpectedly found that these characteristics can be still further increased by including a fluoride or chloride in the chromium oxide.

The method of the present invention comprises packing the alumina or spinel body in chromium oxide, either with or without a fluorinating pretreatment, which chromium oxide includes a fluoride or chloride taken from the group consisting of $CrF_3$, $CrCl_3$, $AlF_3$, $CaF_2$ and $NH_4F$, and then refiring the body. It has been found that a low expansion coating of a solid solution is formed which greatly increases the strength of the body as compared with the method in which there is no fluoride or chloride included in the packing material.

While in the following examples the refiring of the ceramic bodies has been carried out at temperatures in the vicinity of from 1500° C. to 1725° C., it is contemplated that the firing can be carried out anywhere between 1000° C. and a temperature below the melting point of the ceramic material being fired where no pressure is applied to the bodies during firing, and depending on the nature of the materials and the degree of reaction between the raw materials of the coating and the body.

The invention will now be described in greater detail with reference to the accompanying drawings, in which:

FIGS. 3a and 3b are views of the aluminum and magnesium profiles of bodies treated the same as the bodies of FIGS. 2a and 2b;

Figure 1:
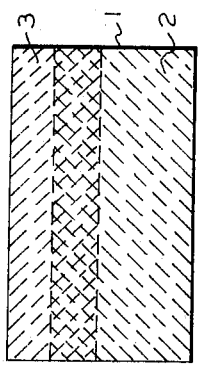
FIG. 1 is a sectional view of a ceramic body having a low expansion coating thereon in accordance with the present invention.

As seen in FIG. 1, a body 1 of ceramic material 2, for example aluminum oxide or spinel, has at least one surface, the top surface in this instance, coated with a low expansion solid solution 2 of a plurality of ceramic materials. The coating materials and the ceramic of the body are intermixed at the interfacing of the coating and the material of the body, there being a gradual increase in the proportion of alumina and a gradual decrease of the proportion of coating material the deeper into the body the determination of the relative amounts of these materials is made. The low expansion coating 3 is of a material which has a lower coefficient of expansion than the ceramic material 2 and is under compression as a result of having been formed on the material 2 at a high temperature, and the temperature of the overall structure reduced to ambient temperature. Since the relative amount of coating material 3 decreases as the distance from the coated surface increases, there is also a stress gradient, the compressive stress being greatest at the surface of the coating and decreasing in proportion to the amount of coating material the greater the distance from said coated surface. In practice it has been found that the good results are achieved when the coating material penetrates into the material 2 of the body a distance of from about .001 on relatively thin bodies, and up to 20% of the thickness of relatively thick bodies. It should be understood that in the present invention the size of the body is increased only slightly. The great majority of the coating material penetrates the material of the body.

In order to produce a body as shown in FIG. 1, a body of alumina or spinel is prepared. It may, if desired, first be fluorinated, for example by soaking it in hydrofluoric acid or subjecting it to the action of hydrogen fluoride, for sufficient time to at least leach out surface impurities, after which it is packed in a mixture of chromium oxide, $Cr_2O_3$, and a fluoride, for example chromium fluoride $CrF_3 \cdot 3\frac{1}{2}H_2O$. The preferred ratio of chromium oxide to fluoride is from 20–70% fluoride. Thereafter, the packed body is refired at a temperature of from 1000° C. to a temperature just below the melting point, but preferably from about 1500–1725° C. for a period of from 1–4 hours.

Tests to determine the flexural strengths of the bodies shows that as compared to the as received controls and bodies packed only in chromium oxide and refired under the same conditions, the bodies packed in the fluoride containing chromium oxide have significantly greater flexural strengths.

In order to further illustrate the method of the present invention and the results obtained thereby, there will be given a series of specific examples.

EXAMPLES 1–6

94% alumina bodies purchased from Frenchtown Porcelain Company (No. 7225) in the form of tiles 3 x 3 x ¼" were cut into test bars 3 x ¼ x %4" by diamond sawing.

A first group of 5 samples was used as controls, and a second group of 5 samples was packed in $Cr_2O_3$ only and refired at 1500° C. in a gas kiln for four hours. Six further groups of five samples each were then packed in various mixtures of $Cr_2O_3$ and $CrF_3 \cdot 3\frac{1}{2}H_2O$, except for the last group in which the $Cr_2O_3$ was omitted. The samples were refired at the same conditions as the second group of samples. The proportions of $Cr_2O_3$ and $CrF_3 \cdot 3\frac{1}{2}H_2O$, and the type of kiln used to refire the respective groups are given in Table I, together with the average flexural strengths of the refired bodies.

TABLE I.—FLEXURAL STRENGTH OF ALUMINA PACKED IN VARIOUS MIXTURES OF $Cr_2O_3$ AND $CrF_3 \cdot 3\frac{1}{2}H_2O$

[Frenchtown 94% alumina refired at 1,500° C. for four hours) samples cut from tiles]

| Number | Treatment | Number samples | Average flexural strength, p.s.i. | Strength difference, p.s.i. |
|---|---|---|---|---|
| | As cut, controls | 5 | 34,200 | |
| | Packed in $Cr_2O_3$, gas kiln | 5 | 41,800 | +7,600 |
| 1 | Packed in 90% $Cr_2O_3$ plus 10% $CrF_3 \cdot 3\frac{1}{2}H_2O$, gas kiln | 5 | 36,600 | +2,200 |
| 2 | Packed in 70% $Cr_2O_3$ plus 30% $CrF_3 \cdot 3\frac{1}{2}H_2O$, electric kiln | 5 | 49,500 | +15,300 |
| 3 | Packed in 50% $Cr_2O_3$ plus 50% $CrF_3 \cdot 3\frac{1}{2}H_2O$. electric kiln | 5 | 50,300 | +16,100 |
| 4 | Packed in 50% $Cr_2O_3$ plus 50% $CrF_3 \cdot 3\frac{1}{2}H_2O$, gas kiln | 5 | 41,900 | +7,700 |
| 5 | Packed in 30% $Cr_2O_3$ plus 70% $CrF_3 \cdot 3\frac{1}{2}H_2O$, electric kiln | 5 | 50,800 | +16,600 |
| 6 | Packed in 100% $CrF_3 \cdot 3\frac{1}{2}H_2O$, gas kiln | 5 | 41,700 | +7,500 |

It will be seen that except for Example 1 where the proportion of fluoride is low, and Example 6 where there is no $Cr_2O_3$ present, the flexural strengths are higher than when $Cr_2O_3$ is used alone.

EXAMPLES 7–10

Pretreatment by fluorinating the alumina bodies is effective to increase the strength of the bodies. In these examples, six further groups of alumina bodies having the same characteristics as those in Examples 1–6 were prepared and each group was leached in hydrofluoric acid to a depth of 0.010 in., and after rinsing was treated as listed in Table II. The samples of Example 7 were dipped four times in $CrCl_3$ solution, and then packed in $Cr_2O_3$ and refired at 1650° C. for one hour. The samples of Example 8 were packed in $Cr_2O_3$ with 20% $CrF_3 \cdot 9H_2O$ while the samples of Example 9 were packed in $Cr_2O_3$ with 40% $CrF_3 \cdot 3\frac{1}{2}H_2O$. The samples of Example 10 were packed in $Cr_2O_3$ with 20% $AlF_3 \cdot 6H_2O$, while the samples of Examples 11 and 12 were packed in $Cr_2O_3$ and 10% $CaF_2$ and $CrCl_3 \cdot 6H_2O$, respectively. All were refired at the same conditions as the controls and the samples of Example 7. The proportions of the packing materials are given in Table II as are the average flexural strengths of the fired bodies.

TABLE II.—FLEXURAL STRENGTH OF ALUMINA PACKED IN MIXTURES OF $Cr_2O_3$ PLUS VARIOUS FLUORIDES AND CHLORIDES

[(Frenchtown 94% alumina fired at 1,650° C. for one hour) samples cut from tiles]

| Number | Treatment | Number samples | Average flexural strength, p.s.i. | Strength difference, p.s.i. |
|---|---|---|---|---|
| | Controls, refired | 30 | 30,900 | |
| | Controls, leached to 0.010 in., refired | 4 | 29,900 | |
| 7 | Leached to 0.010 in., dipped 4× in $CrCl_3$ soln,. packed in $Cr_2O_3$ | 30 | 36,100 | +6,200 |
| 8 | Leached to 0.010 in., packed in 80% $Cr_2O_3$ plus 20% $CrF_3 \cdot 9H_2O$ | 5 | 45,300 | +15,400 |
| 9 | Leached to 0.010 in., packed in 60% $Cr_2O_3$ plus 40% $CrF_3 \cdot 3\frac{1}{2}H_2O$ | 19 | 46,400 | +16,500 |
| 10 | Leached to 0.010 in., packed in 80% $Cr_2O_3$ plus 20% $AlF_3 \cdot 6H_2O$ | 5 | 38,800 | +8,900 |
| 11 | Leached to 0.010 in., packed in 90% of $Cr_2O_3$ plus 10% $CaF_2$ | 4 | 39,700 | +9,800 |
| 12 | Leached to 0.010 in., packed in 90% $Cr_2O_3$ plus 10% $CrCl_3 \cdot 6H_2O$ | 5 | 41,300 | +11,400 |

Improvements in strength were observed for additions of chromium fluoride, aluminum fluoride, and chromium chloride to the $Cr_2O_3$ packing material. Chromium fluoride additions led to greater penetration of the chromium into the body, and improve surface texture. Additions of calcium fluoride also resulted in an increase in strength.

Figure 2B:
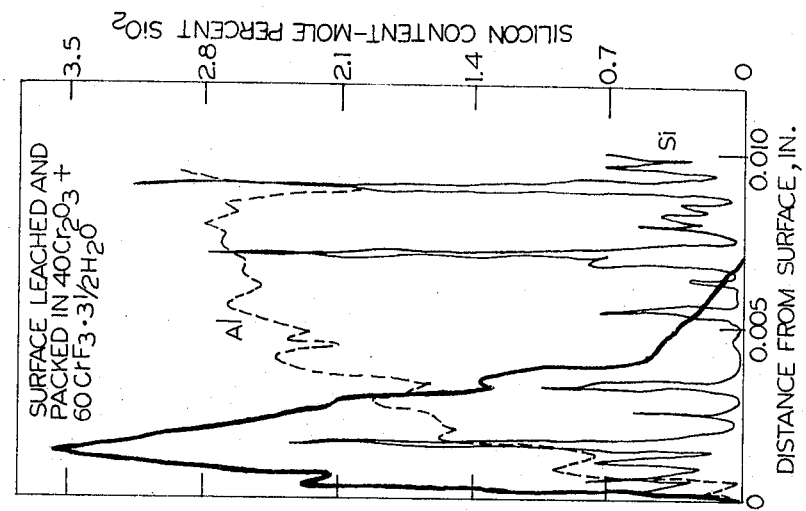
FIG. 2b is a silicon profile of the composition of the surface layer of a body which has been leached and then packed in $Cr_2O_3$ and a fluoride and fired.
Figure 2A:
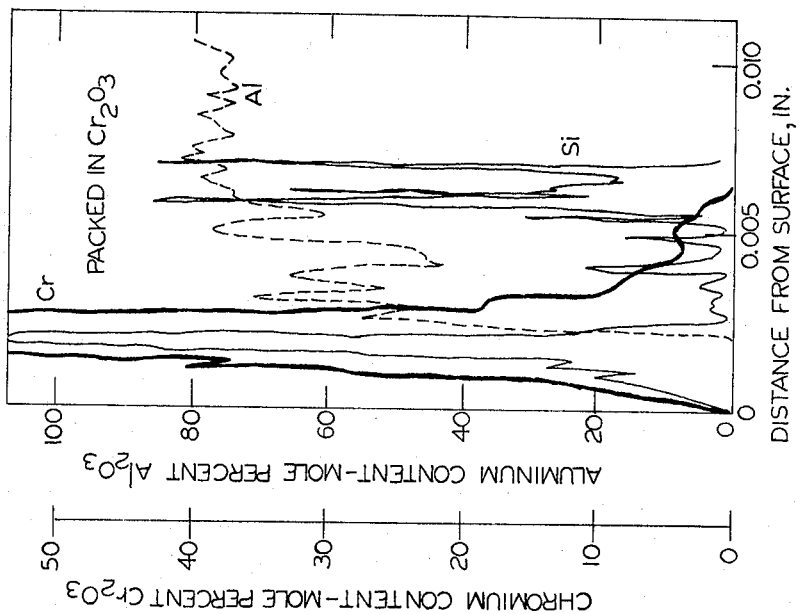
FIG. 2a is a view of the aluminum, chromium profiles of the composition of the surface layer of a body packed only in $Cr_2O_3$ and fired.

When $Cr_2O_3$ alone is used as the packing material for unleached alumina, silicon accumulates in the surface layer, as shown in FIG. 2a. Leaching and packing in $Cr_2O_3 + CrF_3 \cdot 3\frac{1}{2}H_2O$ prevent this accumulation of silicon as shown in FIG. 2b.

Packing in material containing the fluoride results in accumulation of magnesium in the surface layer as indicated by comparing FIGS. 3a and 3b. The aluminum content of the surface layer is very low in the region where the magnesium accumulates so that the magnesium is probably present in the form of picrochromite (magnesium chromium spinel, $MgO \cdot Cr_2O_3$). Since picrochromite has a lower expansion coefficient than $Cr_2O_3$, the presence of this phase in the surface layer aids in obtaining high compressive stresses.

EXAMPLE 13

A group of samples corresponding to the samples of Examples 7–12 was prepared, and the samples were leached in hydrofluoric acid to a depth of 0.010 in. by soaking in hydrofluoric acid. The samples were then packed in $Cr_2O_3$ without being rinsed and were then refired at 1650° C. for one hour. As compared to the refired controls of Table II, the average flexural strength was 46,400 p.s.i., a strength difference of +16,500 p.s.i.

EXAMPLES 14–18

In order to determine the effect of refiring conditions on the flexural strength groups of alumina the same as those in Examples 1–6 were prepared, and were packed in a mixture of 50% $Cr_2O_3$ and 50% $CrF_3 \cdot 3\frac{1}{2}H_2O$. The various groups were refired at temperatures from 1500 to 1725° C. for various times, as set forth in Table III, and the resulting samples had average flexural strengths as shown in the table.

TABLE III.—EFFECT OF FIRING CONDITIONS ON FLEXURAL STRENGTH OF TREATED ALUMINA (Frenchtown 94% alumina packed in 50% $Cr_2O_3$ plus 50% $CrF_3 \cdot 3\frac{1}{2}H_2O$)

| No. | Kiln | Firing conditions temperature, ° C. | Time, hours | Number samples | Average flexural strength p.s.i. |
|---|---|---|---|---|---|
| 14 | Electric | 1,500 | 4 | 5 | 50,300 |
| 15 | Gas | 1,500 | 4 | 5 | 41,900 |
| 16 | Gas | 1,650 | 1 | 5 | [1] 47,200 |
| 17 | Gas | 1,650 | 4 | 5 | [1] 39,000 |
| 18 | Gas | 1,725 | 1 | 5 | [1] 37,300 |

[1] Samples leached to depth of 0.010 in.

The results show that the best results are achieved at lower temperatures in a kiln with a still atmosphere, i.e. an electric kiln. At higher temperatures and longer refiring times in the gas fired kilns with a turbulent atmosphere, much of the benefit is lost.

EXAMPLE 19

The invention is also applicable to spinels. Four groups of Degussa SP–23 Spinel samples were prepared in the form of hollow cylinders, the first group of which were used as controls, the second group being simply refired at 1650° C. for one hour, and the third group being packed only in $Cr_2O_3$ and refired in a like manner. The samples of Example 19 were surface fluorinated with hydrofluoric acid and were packed in a mixture of 90% $Cr_2O_3$ and 10% $CrCl_3 \cdot 6H_2O$, and were then refired under the same conditions as for the other spinel bodies. The flexural strengths were as shown in Table IV, from which it is seen that the strength is increased when the chloride is added to the chromium oxide in which the bodies are packed for refiring.

TABLE IV.—FLEXURAL STRENGTH OF DEGUSSA SP-23 SPINEL WITH VARIOUS PACKING MATERIALS

| Number | Treatment | Firing Conditions | | Number samples | Flexural strength data | |
|---|---|---|---|---|---|---|
| | | Temp., ° C. | Time, hours | | Average flexural strength, p.s.i. | Strength difference, p.s.i. |
| | Degussa SP-23 controls, as cut | | | 4 | 21,850 | |
| | Degussa SP-23 controls, refined | 1,650 | 1 | 5 | 20,400 | |
| | Degussa SP-23 packed in $Cr_2O_3$ | 1,650 | 1 | 5 | 25,300 | 4,900 |
| 19 | Degussa SP-23 surf. fluor., packed in 90% $Cr_2O_3$ plus 10% $CrCl_3 \cdot 6H_2O$. | 1,650 | 1 | 5 | 26,550 | 6,150 |

EXAMPLES 20–35

A group of 5 alumina rods 0.138″ in diameter and made of 96% alumina Al Si Mag 614, American Lava Corporation) were packed in $Cr_2O_3$ and fired for 1 hour at 1500° C. A set of eight groups of 5 rods each were packed in mixtures of $Cr_2O_3$ and $CrF_3 \cdot 3\frac{1}{2}H_2O$ in various weight ratios, and these eight groups of rods were also fired at 1500° C. for 1 hour. A further set of eight groups of 5 rods each were packed in mixtures of $Cr_2O_3$ and $NH_4F$ in various weight ratios and also fired at 1500° C. for 1 hour. The various weight ratios were as set forth in Table V attached hereto. The resulting specimens were

TABLE V.—FLEXURAL STRENGTH OF 96% ALUMINA PACKED IN VARIOUS FLUORIDE MIXTURES (0.138″ diam. rods, 1500° C., 1 hour)

| Number | Treatment | Number samples | Average flexural strength, p.s.i. | Average diameter, in. |
|---|---|---|---|---|
| 20 | Packed in $Cr_2O_3$ | 5 | 51,500 | .1396 |
| 21 | Packed in 90% $Cr_2O_3$ plus 10% $CrF_3 \cdot 3\frac{1}{2}H_2O$. | 5 | 52,100 | .1386 |
| 22 | 80:20 | 5 | 56,300 | .1378 |
| 23 | 70:30 | 5 | 58,700 | .1380 |
| 24 | 60:40 | 5 | 63,300 | .1386 |
| 25 | 50:50 | 5 | 61,000 | .1380 |
| 26 | 40:60 | 5 | 61,700 | .1386 |
| 27 | 30:70 | 5 | 59,300 | .1390 |
| 28 | Packed in 90% $Cr_2O_3$ plus 10% $NH_4F$ | 5 | 55,800 | .1386 |
| 29 | 80:20 | 5 | 61,200 | .1384 |
| 30 | 70:30 | 5 | 62,800 | .1380 |
| 31 | 60:40 | 5 | 58,500 | .1372 |
| 32 | 50:50 | 5 | 51,800 | .1374 |
| 33 | 50:50 | 5 | 55,000 | .1378 |
| 34 | 40:60 | 5 | 53,900 | .1374 |
| 35 | 30:70 | 5 | 54,700 | .1376 | tested for flexural strength by 4 point loading on a 2 inch span. The average diameters of the specimens and the average flexural strengths were found to be as shown in attached Table V, and the average flexural strengths are plotted in FIG. 4. Diameters are shown next to the plotted strengths.

Figure 4:
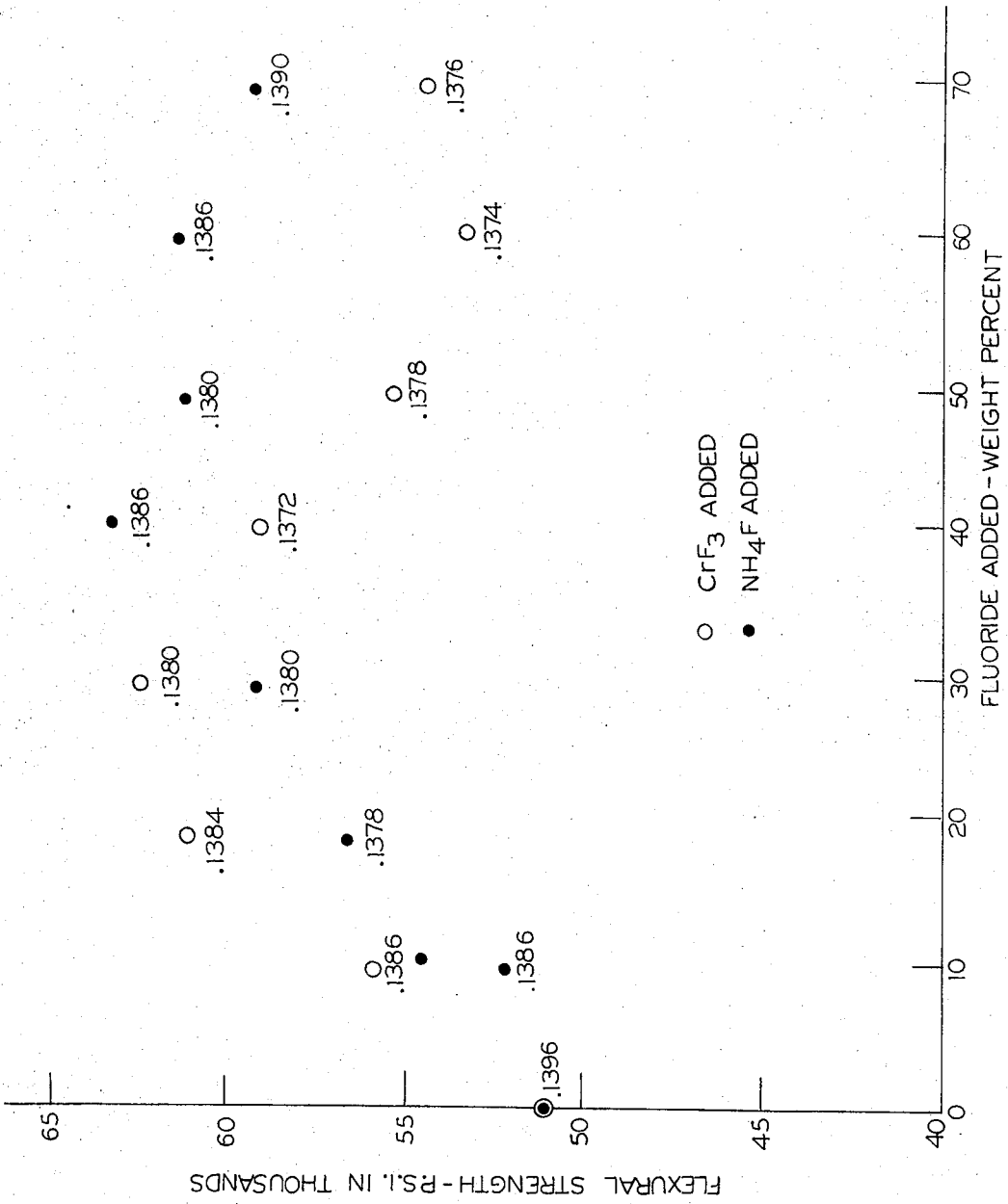
FIG. 4 is a graph of flexural strength v. percent of fluoride for additions of various amounts of $CrF_3$ and $NH_4F$ to the packing material.

As can be seen from the data in Table V and from FIG. 4, the strength of the specimens is increased significantly as compared with the specimens packed in $Cr_2O_3$ only, particularly where the amount of the halide added is 20% and greater. The graph shows that the strength of the specimens where the $NH_4F$ is added to the packing reaches a peak sooner than where the $CrS_3$ is added.

Reference is made to the diameters of the rods as evidence that more is taking place than a mere transfer of the packing material to the surface of the rods. The diameters increase only slightly when the method according to the present invention is carried out. It is therefore clear that what is happening is that the transferred material is penetrating into the surface layer and combining with the material of the body to form the low coefficient of expansion layer which is contributing to the increased strength being sought.

EXAMPLES 36–38

A group of 5 alumina rods 0.138" in diameter and made of 96% alumina (Al Si Mag 614, American Lava Corporation) were packed in $Cr_2O_3$ and fired at 1500° C. for 1 hour. A second group of 5 identical rods were packed in a mixture of $Cr_2O_3$ and 0.5% by weight $NH_4F$ and fired under the same conditions, while a third group of 5 identical rods were packed in a mixture of $Cr_2O_3$ and 0.5% by weight $NH_4F$ and 0.1% by weight $NH_4NO_3$ and also fired at the same conditions. The resulting specimens were tested for flexural strength by 4 point loading on a 2 inch span. The average diameters of the specimens and the average flexural strengths were found to be as shown in Table VI, which also gives the same data for

TABLE VI.—FLEXURAL STRENGTH OF 96% ALUMINA PACKED IN VARIOUS FLUORIDE MIXTURES

| Number | Treatment | Treatment conditions | | Average diameter | Number samples | Average flexural strength, p.s.i. |
|---|---|---|---|---|---|---|
| | | Temp., ° C. | Time | | | |
| | Refired controls | 1,500 | 1 | .1372 | 5 | 59,600 |
| 36 | Packed in $Cr_2O_3$ | 1,500 | 1 | .1394 | 5 | 53,000 |
| 37 | Packed in $Cr_2O_3$ plus 0.5% $NH_4F$ | 1,500 | 1 | .1406 | 5 | 49,100 |
| 38 | Packed in $Cr_2O_3$ plus 0.5% $NH_4F$ plus 0.1% $NH_4NO_3$. | 1,500 | 1 | .1416 | 5 | 53,300 | a group of identical rods which were simply fired along with the above described specimens.

It is thus seen that the use of the very small amount of ammonium fluoride in the packing does not increase the strength while it increases the size of the specimens. In the present method, on the other hand, the strength of the specimens is increased without significantly increasing the size of the specimens.

Figure 5C:
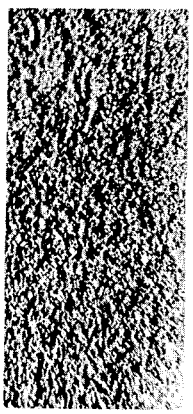
FIGS. 5a–5c are microphotographs of the surface texture of alumina packed in various amounts of $Cr_2O_3$ and $CrF_3$.
Figure 5B:
Figure 5A:
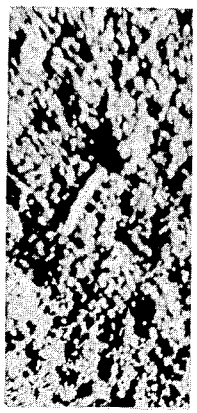

The method of the present invention improves the surface texture of the bodies. FIGS. 5a–5c are three microphotographs of the surface texture of alumina packed in $Cr_2O_3$ only, and in various mixtures according to the invention, and then refired at 1650° C. for 1 hour. The improved surface texture is most noticeable for the 50% $Cr_2O_3$–50% $CrF_3 \cdot 3½H_2O$ mixture. The fine texture of the surface contributes to the improved strength by reducing the magnitude of the surface flaws.

What is claimed is:

1. A method of strengthening a body of a ceramic material taken from the group consisting of alumina and spinel of the $Al_2O_3$-MgO type by forming at an elevated temperature on at least one surface of the body a coating of a low coefficient of expansion material having a lower coefficient of expansion than said ceramic material, said method comprising the steps of packing the ceramic body in a mixture of $Cr_2O_3$ and a halogen containing salt taken from the group consisting of $CrF_3$, $CrCl_3$, $AlF_3$, $CaF_2$, and $NH_4F$, and refiring the thus packed ceramic body for a time and at a temperature for diffusing the $CrO_3$ from the packing to the body and diffusing it into the body and combining it with the material of the body to form said low coefficient of expansion material, and for forming a surface on said strengthened body having an improved surface texture as compared to a body formed by firing without the halogen containing salt.

2. A method as claimed in claim 1 in which, when the halogen containing salt is $CrF_3$ or $AlF_3$ it is present in the mixture in an amount of at least 20% by weight, and when the halogen containing salt is $CrCl_3$, $CaF_2$ or $NH_4F$ it is present in the mixture in an amount of at least 10% by weight.

3. The method as claimed in claim 1 in which the mixture of materials in which the body is packed is 80% $Cr_2O_3$ and 20% $AlF_3 \cdot 6H_2O$.

4. The method as claimed in claim 1 in which the mixture of materials in which the body is packed is a mixture of $Cr_2O_3$ and $CrF_3$.

5. The method as claimed in claim 4 in which the amount of $CrF_3$ is from 20–70% of the mixture.

6. The method as claimed in claim 5 in which the fluoride is in crystalline form.

7. The method as caimed in claim 5 in which the refiring temperature is from 1500–1725° C.

8. The method as claimed in claim 1 in which the mixture of materials in which the body is packed is 90% $CrO_3$ and 10% $CrCl_3 \cdot 6H_2O$.

9. The method as claimed in claim 1 in which the mixture of materials in which the body is packed is 90% $Cr_2O_3$ and 10% $CaF_3$.

10. The method as claimed in claim 1 in which the mixture of materials in which the body is packed is 30–90% $Cr_2O_3$ and 10–70% $NH_4F$.

11. A method of strengthening a body of a ceramic material taken from the group consisting of alumina and spinel of the $Al_2O_3$-MgO type by forming at an elevated temperature on at least one surface of the body a coating of a low coefficient of expansion material having a lower coefficient of expansion than said ceramic material, said method comprising the steps of soaking the body in hydrofluoric acid for leaching the surface thereof, packing the ceramic body in a mixture of $Cr_2O_3$ and a halogen containing salt taken from the group consisting of $CrF_3$, $CrCl_3$, $AlF_3$, $CaF_2$ and $NH_4F$, and refiring the thus packed ceramic body for a time and at a temperature for diffusing the $Cr_2O_3$ from the packing to the body and diffusing it into the body and combining it with the material of the body to form said low coefficient of expansion material, and for forming a surface on said strengthened body having an improved surface texture as compared to a body formed by firing without the preliminary soaking.

References Cited

UNITED STATES PATENTS

| 2,418,496 | 4/1947 | Baumann et al. | 106—66 X |
| 3,378,498 | 4/1968 | Weatherley | 117—107.2 P |

ALFRED L. LEAVITT, Primary Examiner

D. A. SIMMONS, Assistant Examiner

U.S. Cl. X.R.

106—65, 66; 117—47, 118, 169 R